United States Patent [19]

Czornij et al.

[11] Patent Number: 5,378,762
[45] Date of Patent: Jan. 3, 1995

[54] POLYMERIC PIGMENT DISPERSANTS FOR USE IN COATING COMPOSITIONS

[75] Inventors: Zenon P. Czornij, Warren; Clint Carpenter, Royal Oak, both of Mich.; Jeffrey DePue, Urbana, Ill.

[73] Assignee: BASF Corporation, Southfield, Mich.

[21] Appl. No.: 172,692

[22] Filed: Dec. 22, 1993

[51] Int. Cl.⁶ .............................................. C08L 71/02
[52] U.S. Cl. ..................................... 525/187; 525/69; 525/123; 525/185; 525/186; 525/440; 524/282; 524/283; 524/284
[58] Field of Search ................. 525/69, 123, 185, 186, 525/187, 440; 524/282, 283, 284

[56] References Cited

U.S. PATENT DOCUMENTS

| | | | |
|---|---|---|---|
| 4,256,809 | 3/1981 | Larsson et al. | 526/219 |
| 4,299,743 | 11/1981 | Pierce et al. | 528/288 |
| 4,327,005 | 4/1982 | Ramlow et al. | 525/11 |
| 4,369,301 | 1/1983 | Konig et al. | 528/45 |
| 4,550,130 | 10/1985 | Kishida et al. | 523/436 |
| 4,554,306 | 11/1985 | Carroll | 525/131 |
| 4,644,030 | 2/1987 | Loewrigkeit et al. | 524/839 |
| 4,849,262 | 7/1989 | Uhl et al. | 525/127 |
| 4,927,891 | 5/1990 | Kamath et al. | 525/327.3 |
| 4,975,494 | 12/1990 | Kamath et al. | 525/327.6 |
| 4,987,186 | 1/1991 | Aklyama et al. | 525/107 |
| 5,091,475 | 2/1992 | Potter et al. | 525/124 |
| 5,106,469 | 4/1992 | Johnson | 525/533 |
| 5,112,931 | 5/1992 | Potter et al. | 528/45 |
| 5,118,721 | 6/1992 | Godoy et al. | 521/103 |
| 5,130,004 | 7/1992 | Johnson et al. | 525/526 |
| 5,216,078 | 6/1993 | Cook et al. | 525/124 |
| 5,231,134 | 7/1993 | Carpenter et al. | 525/127 |
| 5,270,399 | 12/1993 | Czornij et al. | 524/283 |

*Primary Examiner*—Melvyn I. Marquis
*Assistant Examiner*—Randy Gulakowski
*Attorney, Agent, or Firm*—Anne Gerry Sabourin

[57] ABSTRACT

The present invention is directed to a pigment dispersant for use in coating compositions. The dispersant is the reaction product of a functionalized copolymer, a polyalkylene glycol monoalkyl compound to impart water soluble character to the copolymer, and a compound having a pigment interactive substituent including hydrazine derivatives and oxime containing compounds.

18 Claims, No Drawings

POLYMERIC PIGMENT DISPERSANTS FOR USE IN COATING COMPOSITIONS

FIELD OF THE INVENTION

The present invention is directed to a modified copolymer. More specifically, the present invention is directed to a modified copolymer pigment dispersant for aqueous coating compositions.

BACKGROUND OF THE INVENTION

Aqueous coating compositions are known and described for example in U.S. Pat. Nos. 4,794,147; 4,791,168; 4,518,724; and 4,403,055.

These aqueous coating compositions comprise a principal resin, and may contain a crosslinker, pigments dispersed in a grind resin and other additives such as solvents, control agents, fillers and the like.

Many pigments, especially organics, used in coating compositions for the automotive industry are hydrophobic. These pigments, when used in aqueous coating systems require the use of specialized grind resins with the additions of dispersing agents and solvents to overcome their incompatibility with water and poor ability to grind.

Pigment pastes are usually prepared by dispersing a pigment in a grind resin in the presence of plasticizers, wetting agents, surfactants or other ingredients in a ball mill, sand mill or continuous mill, until the pigment has been reduced to the desired particle size and is wetted by the resin or dispersed in it.

One disadvantage of pigment pastes is that the pastes often require a large amount of resin relative to pigment, and the resulting pigment pastes are not very concentrated. In addition, pastes made with conventional resins often do not have optimum color development.

The present invention is directed to a pigment dispersant for an aqueous coating composition that provides stable aqueous pigment pastes or pigment dispersions. The dispersants of the present invention provide pigment grinds with enhanced formulating latitude. The present invention is also directed to an aqueous coating composition containing the pigment dispersants and an article coated with the coating composition.

SUMMARY OF THE INVENTION

The present invention is a polymeric dispersant for pigments. The dispersant includes a) a copolymer functionalized with isocyanate, anhydride or epoxy functionalities, b) a polyalkylene glycol homopolymer or copolymer, grafted onto the copolymer, to impart water-soluble character to the polymeric backbone and c) a pigment interactive functionality, grafted onto the copolymer, which enhances pigment dispersion in solution.

The copolymer (a) includes (i) an ethylenically unsaturated monomer having a reactive functionality from which grafting may take place, where said functionality is an isocyanate functionality, an anhydride functionality or an epoxy functionality; and (ii) at least one ethylenically unsaturated monomer having no functional group that reacts with the reactive functionality of monomer (i). The copolymer may also include an additional monomer (iii) that is an ethylenically functional aromatic compound. Compounds (i) and (ii) and optionally (iii) form a polymeric backbone wherein the functional groups on monomer (i) are present as sidechains on the backbone.

A portion of these sidechains are reacted with at least one polyalkylene glycol compound that is a polyalkylene glycol or amine substituted polyalkylene glycol homopolymer, copolymer, or mixture thereof, to react with the reactive functionality of monomer (i) to impart water soluble character to the polymer. When the reactive functionality of monomer (i) is an isocyanate functionality or an anhydride, the polyalkylene glycol compound reacts with the isocyanate or anhydride reactive functionality to form a sidechain. When the reactive functionality of monomer (i) is an epoxy functionality, an amine substituted polyalkylene glycol compound can be reacted directly with the epoxy functionality. Other polyalkylene glycol compounds must first be reacted with anhydride to form an acid functional polyalkylene glycol compound to react with the epoxy functionality.

Useful polyalkylene glycol compounds include polyalkylene glycol monoalkyl ethers and amine terminated polyalkylene glycol monoalkyl ethers and mixtures thereof.

Another portion of the functional group sidechains are reacted with a compound having a pigment interactive substituent, which is a hydrazine derivative or an oxime. The compound having a pigment interactive substituent is selected from the group consisting of hydrazides substitued with aliphatic, aromatic and substituted aromatic substituents, including alkyl, alkoxy, halogen and hydroxy substituted aromatic substituents and imines having the formula

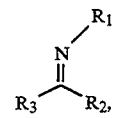

where where $R_1$ is OH or NHR', and R' is H, alkyl, aryl or substituted aryl Where $R_1$ is NHR' the compounds are hydrazones. Where $R_1$ is OH the compounds are oximes. The $R_2$ and $R_3$ can be the same or different and are functionalities selected from the group consisting of hydrogen and aliphatic, aromatic, fused aromatic, benzoyl, substituted benzoyl, alkanoyl, substituted alkanoyl and substituted aromatic substituents, wherein the subitution is alkyl, alkoxy, halogen or hydroxy, and mixtures thereof. The compound having a pigment interactive substituent enhances pigment dispersion in solution.

Where the functional group provided by monomer (i) is an isocyanate group, any isocyanate functionality remaining after reaction with the polyalkylene glycol compound (b) or the compound having a pigment interactive substituent (c), may be capped by the addition of a end-capping compound (d) having an amine or hydroxy functionality which reacts with the isocyanate. These amine and hydroxy containing compounds are selected from the group consisting of mono or dialkyl amines, mono or dicycloalkyl amines, aromatic amines, aryl aliphatic amines, mono and di alkanolamines, cyclic alkanolamines and primary and secondary ether alcohols.

DETAILED DESCRIPTION OF THE INVENTION

The present invention is directed to a polymeric pigment dispersant, coating composition containing the dispersant, and articles coated with the dispersant-containing coating. The dispersant includes a) a copolymer functionalized with isocyanate, anhydride or epoxy functionalities, b) a polyalkylene glycol homopolymer or copolymer, reactive with the functionality on the copolymer, to impart water-soluble character to the polymeric backbone and c) a compound having a pigment interactive substituent, also reactive with the reactive functionality on the copolymer, to provide enhanced pigment dispersion in solution.

The copolymer (a) includes (i) an ethylenically unsaturated monomer having a reactive functionality from which grafting may take place, where said functionality is an isocyanate functionality, an anhydride functionality or an epoxy functionality; and (ii) at least one ethylenically unsaturated monomer having no functional group that reacts with the reactive functionality of monomer (i). The copolymer may also include an additional monomer (iii) that is an ethylenically functional aromatic compound. Compounds (i) and (ii) and optionally (iii) form a polymeric backbone wherein the functional groups on monomer (i) are present as sidechains. Compounds (b) the polyalkylene glycol homopolymer or copolymer and (c) the compound having a pigment interactive substituent, are grafted onto the polymeric backbone by reaction with the functional groups provided by monomer (i).

The ethylenically unsaturated monomer (i) is present in an amount between about 5% to about 50% by weight, preferably from about 20% to about 40% by weight based on total monomer weight. Suitable ethylenically unsaturated monomers containing an isocyanate functionality include dimethyl-meta-isopropenylbenzyl isocyanate, vinylisocyanate, isocyanatoethyl acrylate and isocyanato ethyl methacrylate, isopropenyl isocyanate, and mixtures thereof. Preferred is dimethyl-meta-isopropenylbenzyl isocyanate, also referred to as TMI®, available from American Cyanamid Co. Wayne, N.J. 07647.

Suitable ethylenically unsaturated monomers containing an anhydride functionality include olefinic and cycloolefinic anhydrides and aromatic anhydrides having a reactable double bond. The aromatic anhydrides include aliphatic and aromatic substituted anhydrides, provided that the substituents do not adversely affect the reactivity of the anhydride or the properties of the resultant polymer. Examples of these substituents include chloro, alkyl and alkoxy substituents.

Examples of specific anhydrides include dodecenyl succinic anhydride, octadecenylsuccinic anhydride, tetrahydrophthalic anhydride, methyltetrahydrophthalic anhydride, endomethylene tetrahydrophthalic anhydride, chlorendic anhydride, itaconic anhydride, citraconic anhydride and maleic anhydride.

Preferred monomers containing the anhydride functionality are itaconic anhydride and maleic anhydride.

Suitable ethylenically unsaturated monomers containing an epoxy functionality include glycidyl acrylate, glycidyl methacrylate, and allyl glycidyl ether. The preferred monomer containing the epoxy functionality is glycidyl methacrylate.

The ethylenically unsaturated monomers (ii), are present in an amount from about 10% to about 90% by weight, preferably from about 40% to about 70% by weight based on total monomer weight. Suitable monomers having no functionality that reacts with the reactive functionality of monomer (i), include acrylic and methacrylic alkyl, aryl, aryl alkyl and alkoxyalkyl esters. The alkyl esters of acrylic and methacrylic acid are derived from alcohols having from 1 to about 20 carbon atoms, from phenols or from vinyl monomers.

Preferred are the esters of acrylic and methacrylic acid such as methyl, ethyl, propyl, n-butyl, isobutyl, tertbutyl, cyclohexyl, and 2-ethylhexyl acrylates and methacrylates and mixtures thereof.

Also suitable are vinyl chloride, acrylamide and methacrylamide, acrylonitrile, methacrylonitrile, N-alkyl maleimides, N-aryl malemides and acrolein. Maleic acid and fumaric acid dialkyl esters in which the alkyl groups have 1 to 20 carbon atoms may also be used.

The ethylenically functional aromatic substituted monomer (iii), when included, is present in an amount from about 5% to about 40% by weight, preferably from about 10% to about 20% by weight, based on total monomer weight.

Suitable monomers include styrene, alpha-methyl styrene, para-hydroxy styrene, tert-butyl styrene and vinyl toluene and halogenated vinyl benzenes such as chlorostyrene. Also useful are acrylic and methacrylic esters such as para-tolyl acrylate, phenylethyl acrylate, naphthyl acrylate, phenyl methacrylate, naphthyl methacrylate, 3-phenylpropyl methacrylate, phenoxyethyl methacrylate. Additional useful monomers are aromatic-containing acrylamides and methacrylamides such as N-phenylacrylamide and mixtures of acrylamides. The preferred ethylenically unsaturated aromatic substituted monomers are styrene and phenyl methacrylate.

All weight percentages for the monomers (i)–(iii) reflect a variance of ±5%.

At least one polyalkylene glycol compound which is a polyalkylene glycol or amine substituted homopolymer, copolymer, or mixture thereof is reacted with the reactive functionality provided by monomer (i), to impart water soluble character to the polymer. In one embodiment, the polyalkylene glycol compound can be incorporated by reaction with the reactive functionality on monomer (i) before formation of the copolymer. Alternatively, the polyalkylene glycol compound may be incorporated by reaction with the reactive functionality on the copolymer. The polyalkylene glycol compound is present in an amount between about 20% and about 60% by weight, preferably between about 30% and about 40% by weight, based on total non-volatile content of the dispersant. The weight percentages reflect a variance of ±5%.

Useful compounds for this purpose are polyalkylene glycol monoalkyl ethers, amine substituted polyalkylene glycol monoalkyl ethers and mixtures thereof. Examples of these include polyalkylene glycol monoalkyl ethers formed from monoalcohol initiated polymerization of ethylene oxide, propylene oxide and mixtures thereof with up to 30% by weight propylene oxide. Starting monoalcohols are $C_1$–$C_{18}$ alcohols such as methanol, ethanol, n-propanol, isopropanol, hexanol, decanol, undecanol and ether alcohols such as methoxyethanol, butoxyethanol and the like. The preferred monoalkyl ethers are polyethylene glycol monoalkyl ethers, and polyethylene glycol ethers in mixture with other polyalkylene glycol monoalkyl ethers.

The polyalkylene glycol compound reacts with the reactive functionality provided by monomer (i) to form a side chain. When the reactive functionality of monomer (i) is an isocyanate or an anhydride, the polyalkylene glycol compound reacts with the isocyanate or anhydride reactive functionality.

When the reactive functionality of monomer (i) is an epoxy functionality, the polyalkylene glycol must first be reacted with anhydride to form an acid functional polyalkylene glycol. The acid functional polyalkylene glycol can be reacted with the epoxy functional monomer before the polymerization reaction or with the functionalized copolymer after polymerization of monomers (i) and (ii) or (i)–(iii).

A compound having a pigment interactive substituent (c), is grafted onto the polymeric backbone by reaction with the reactive functionality provided by monomer (i). The compound having a pigment interactive substituent includes hydrazides substitued with aliphatic, aromatic and substituted aromatic substituents, including alkyl, alkoxy, halogen and hydroxy substituted aromatic substituents and imines having the formula

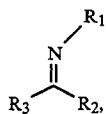

where $R_1$ is OH or NRH', and R' is H, alkyl, aryl or substituted aryl. $R_2$ and $R_3$ can be the same or different and are functionalities selected from the group consisting of aliphatic, aromatic, fused aromatic, substituted aromatic, wherein the subtitution is alkyl, alkoxy, halogen, hydroxy, benzoyl and alkanoyl, substituted benzoyl or substituted alkanoyl substituents and mixtures thereof.

Examples of suitable hydrazides include benzoic hydrazide, oxamic hydrazide, 4-hydroxybenzoic hydrazide, 4-phenylsemicarbazide, napthoic and substituted napthoic hydrazide, formic hydrazide, acetic hydrazide, benzenesulfonyl hydrazide and substituted benzenesulfonyl hydrazide.

Examples of imine containing compounds include hydrazones such as benzil monohydrazone, fluorenone hydrazone, benzophenone hydrazone and salicylaldehyde hydrazone. Additional imine containing compounds include oximes such as benzil monooxime, fluorenone oxime, benzophenone oxime and salicylaldehyde oxime.

The compound having a pigment interactive substituent is present in an amount between 1.0 and about 25.0 percent by weight, preferably between about 3.0 and about 10.0 percent by weight, based on total non volatile content of the dispersant. Weight percentages reflect a variance of ±0.5 percent. The compound having a pigment interactive substituent can be added directly to the reaction mixture to be polymerized, or can be reacted with the functionalized copolymer after polymerization.

The copolymer is formed by copolymerization using conventional techniques such as heating the monomers in the presence of a polymerization initiating agent and optionally chain transfer agents. The copolymerization may be carried out in bulk or solution. For the present invention it is preferred to form the copolymer by means of a free radical solution polymerization reaction. Solvents for solution polymerization should not have functional groups capable of reacting with the reactive functionalities on monomer (i).

Suitable solvents include ketones, such as methyl ethyl ketone, methyl propyl ketone and acetone; esters, such as butyl acetate and pentyl propionate; ethers, such as diethylene glycol dimethyl ether, dioxane, tetrahydrofuran; N-methyl pyrrolidone, ketoesters, aromatic hydrocarbons, alkanes, cyclic alkanes and mixtures thereof.

Typically initiators are peroxides such as dialkyl peroxides, peroxyesters, peroxydicarbonates, diacyl peroxides, hydroperoxides, and peroxyketals and azo compounds such as 2,2'-azobis(2-methylbutanenitrile) and 1,1'-azobis (cyclohexanecarbonitrile).

Typical chain transfer agents are mercaptans such as octyl mercaptan, n- or tert- dodecyl mercaptan; halogenated compounds; thiosalicylic acid, mercaptoacetic acid, mercaptoethanol, buten-1-ol and dimeric alpha-methyl styrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between one minute and thirty minutes.

The solvent or solvent mixture is generally heated to the reaction temperature and the monomers and initiator(s) are added at a controlled rate over a period of time, usually between 2 and 6 hours. A chain transfer agent or additional solvent may also be fed in at a controlled rate during this time. The temperature of the mixture is then maintained for a period of time to complete the reaction. Optionally, additional initiator may be added to ensure complete conversion.

The NCO number of a copolymer formed from monomer (i) containing an isocyanate reactive functionality and monomer (ii) is from about 0.3 meq/g NV to 3.0 meq/g NV, preferably from about 0.9 meq/g NV to about 2.0 meq/g NV. The copolymer has a weight average molecular weight determined by GPC versus polystyrene standards of from about 3,000 to about 25,000, preferably from about 4,000 to about 10,000.

As stated above, the polyalkylene glycol compound and compound having a pigment interactive substituent may be added before or after the polymerization of monomers (i) and (ii) or (i)–(iii). If the compounds are added before the polymerization reaction, they are combined with monomer (i) and react with the reactive functionality on monomer (i), (i.e. anhydride, isocyanate or epoxy functionality). Monomer (i) is then polymerized with monomers (ii) and (iii). This is usually done by an addition polymerization reaction.

The polyalkylene glycol compound and compound having a pigment interactive substituent also may be added after the polymerization of monomers has occurred. In this case the compounds react with the reactive functionality on the copolymer (i.e. anhydride, isocyanate or epoxy functionality), to form sidechains on the copolymer. If the reactive functionality is epoxy the polyalkylene glycol compound must be amine or acid functional for the reaction to occur.

Any isocyanate remaining after the copolymer is reacted with the polyalkylene glycol compound (b) and the compound having a pigment interactive substituent (c), is end-capped with amine or hydroxy containing compound (d). Amine or hydroxy compounds useful for end-capping the isocyanate are selected from the group consisting of mono or dialkyl amines, such as n-propyl amine, isopropyl amine, n-hexyl amine, 2-ethyl hexyl amine, n-decyl amine, stearyl amine; $C_4$–$C_{18}$ mono or dicycloalkyl amines, such as cyclopentyl amine, cyclohexyl amine, dicyclohexyl amine; heterocyclic $C_4$–$C_{18}$ amines, such as pyrrolidine, piperidine, and morpholine; aromatic $C_6$–$C_{18}$ amines, such as aniline, p-toluidine, o-toluidine, diphenyl amine, indole and indoline; araliphatic $C_7$–$C_{18}$ amines, such as benzyl amine, dibenzylamine and 2-phenyl ethylamine; $C_2$–$C_{36}$ mono and di-alkanolamines, such as ethanol amine, diethanol amine, isopropanol amine, n-hexanol amine, n-undecanol amine. 3-aminopropanol, aminocyclohexanol, 2-(2-aminoethoxy) ethanol: $C_1$–$C_{36}$ ether alcohols, such as methoxyethanol, butoxyethanol, 1-butoxy-2-propanol, (butoxyethoxy) ethanol and solketal.

The amine or alcohol may be reacted in a stepwise reaction or simultaneously with the reactive functionality on the copolymer. The stepwise reaction is preferred. The reaction is usually carried out at temperatures of from about 50° C. to about 130° C. The reaction may be carried out in the presence of the same organic solvents which have been used in the polymerization reaction and in the presence of a catalyst such as organic tin compounds and/or tertiary amine.

The final copolymers have a weight average molecular weight of from about 3,000 to about 25,000, preferably from about 5,000 to about 12,000. The molar ratio of hydrogen functionality on the amino or hydroxy containing compound to the reactive functionality on the copolymer is from about 0.5 to about 2.0 and preferably from about 0.8 to about 1.3.

Pigment pastes are prepared by dispersing pigments or dyestuffs in a solution of the copolymer in water with optional cosolvent and grinding in a ball mill, sand mill, cowlesmill, attritor, or continuous mill.

The pigment dispersant may be used with both inorganic or organic dye stuffs or pigments. Examples of these include graphite, carbon black, zinc chromate, strontium chromate, barium chromate, lead chromate, lead cyanide, titanium dioxide, zinc oxide, iron oxide, aluminum flakes, mica flakes, zinc sulfide, isoindolinones, phthalocyanine complexes, napthol red, carbazole violet, perylene reds, quinacridones, indanthrone, diketopyrrolopyrrole, and halogenated thioindigo pigments. The invention is a particularly useful dispersant for organic pigments.

For the preparation of pigment paste, the pigments or dyestuffs are dispersed in a solution of the copolymer in water with optional cosolvent, and ground in a ball mill or other mill. The pigment paste has a concentration of from about 10 to about 60% by weight of pigments based on the total weight of the pigment paste.

The pigment paste of the present invention is added to water dispersible film forming resin such as those described in U.S. Pat. No. 4,794,147; 4,791,168; 4,518,724; and 4,403,085. These patents also describe the principle resin. Preferred principle resins are described in U.S. Pat. Nos. 4,794,147 and 4,791,168.

The concentration of the pigment paste in the aqueous coating composition is from about 3 to about 25% by weight based on the total weight of the aqueous coating composition.

Coating compositions of the present invention are formulated by mixing the pigment dispersions of the present invention, along with other components, into water dispersible basecoat compositions. Examples of the water dispersible basecoat compositions include, but are not limited to, water dispersible film forming resins such as a water dispersible non-ionic polyurethane resin of the type disclosed in U.S. Pat. No. 4,794,147, a water dispersible anionic polyurethane resin of the type of the type disclosed in U.S. Pat. No. 4,791,168, or a water dispersible acrylic resin of the type disclosed in U.S. Pat. Nos. 4,403,085 and 4,518,724. The resin is mixed with an aminoplast resin, polyisocyanate, or other suitable cross-linking agent, one or more rheology control agents if desired, water and a small amount of organic solvent if needed. Other agents may be included such as various fillers, surfactants, plasticizers, wetting agents, defoamers, adhesion promoters and catalysts in minor amounts.

Other additives may be used, such as organic solvents, catalysts, wetting agents, conditioning agents, thickeners, rheology control agents, antioxidants, surfactants, leveling agents and mixtures thereof.

The basecoat compositions containing the pigment dispersions of the present invention are applied to a metal or plastic substrate in one or more coats. The coating composition may be sprayed or electrostatically deposited onto metal or plastic substrates such as, for example, automotive vehicle bodies. Application may be made, for example, by an air atomizer (Binks Model 62 spray gun, available from the Binks manufacturing Corporation, Franklin Park, Ill.), or by using other conventional spray methods known in the art.

After being deposited, the basecoat compositions may be flash dried at a temperature sufficient to remove a portion of the solvent, but below that sufficient to cure the applied coating, typically temperatures within the range of from room temperature to about 145° F. (63° C.). After the first basecoat is deposited, a second basecoat and subsequent layer of basecoat, if needed or desired can be deposited over the first layer, either with or without flash drying. A clear, transparent top coat layer is then subsequently applied over the last basecoat layer. Any known unpigmented or transparently pigmented coating agent is, in principle, suitable for use as the topcoat material.

After the clear coat is applied over the basecoat layer(s), the multi-layer coating is then baked to cross-link and cure the polymeric materials and to drive the small amount of residual water and/or solvent from the coating layer(s). This baking step generally involves the heating of the coated substrate for periods of from about 10 to about 60 minutes and temperatures ranging between about 150° F. (66° C.) and about 300° F. (149° C.). The baking step cures the multi-layer coating to a hard, durable film.

The invention provides new modified copolymers as dispersant for pigments in coating compositions. These copolymers stabilize dispersions of pigments in aqueous systems. These dispersants allow organic pigments to be more readily dispersed in pigment grinds. Without being bound to any theory, improved pigment dispersibility is believed to result from the increased potential of the polymeric resin to hydrogen bond to the pigment surface. This hydrogen bonding is thought to be enhanced by the pigment interactive substituent present on the graft copolymer. The resulting dispersions provide increased formulating latitude and color styling potential in coating compositions.

Although certain embodiments of the invention have been selected for description in the examples, the examples are merely illustrative and do not in any way limit the scope of the invention as defined in the attached claims.

EXAMPLES

Example 1

Preparation of Isocyanate Functional Acrylic Copolymer 1

231.3 g (2.02 mol) of methyl amyl ketone was charged to a reaction vessel fitted with stirrer and condenser. The solvent was heated to reflux temperature and maintained at reflux for the duration of the reaction. A blend consisting of 94.8 g (0.91 mol) styrene, 160.7 g (1.13 mol) butyl methacrylate, 144.8 g (1.13 mol) butyl acrylate and 271.7 g (1.35 mol) 1-(1-isocyanato-1-methylethyl)-3-(1-methylethenyl) benzene, hereafter referred to as TMI®, available from American Cyanamid Co., Wayne, N.J. 07470, was slowly added over a period of three hours. 67.2 g of 50% active tert-butyl peroxy acetate was added to the monomer blend to initiate the vinyl polymerization. 33.6 g of initiator along with 58.0 g of methyl amyl ketone were added one half hour after the addition of monomer was complete. The mixture was heated for an additional 1.5 hours and then cooled and collected for further modification.

Example 2

Preparation of Modified Copolymer (Grind Resin)

112.0 g, (average molecular weight of 2000) methoxy polyethylene glycol, 3.7 g of a 1% solution of dibutyltin dilaurate in methyl propyl ketone, and 300.0 g isocyanate-functional acrylic prepared in accordance with Example 1 were charged to a reaction vessel fitted with a stirrer and condenser. The mixture was heated to reflux and maintained at reflux for not more than one hour. At the end of this time, the mixture was titrated and the result indicated that all of the methoxy polyethylene glycol had reacted with the isocyanate groups. After the mixture had cooled to approximately 60° C., 17.3 g benzoic hydrazide was added. The mixture was then heated to 120° C. and maintained there for not more than one hour. The mixture was titrated and the result indicated that all to the benzoic hydrazide had reacted with the isocyanate groups. The remainder of the isocyanate functionality was capped with 6.4 g (0.10 mol) monoethanolamine which was added over a period of 5-10 minutes while the mixture was stirred and the temperature was approximately 90° C. The temperature then rose to 98° C. and then subsided. When the exothermic reaction had ceased, the mixture was titrated. Titration revealed no remaining isocyanate functionality. The material was subsequently dispersed with 10.0 g (0.55 mol) of deionized water.

Example 3

Red Pigment Paste 1

A red pigment paste was prepared by adding 22.50 parts by weight quinacridone pigment (C.I. Pigment Violet 19) to a stirred mixture of 3.22 parts by weight grind resin was prepared in accordance with Example 2 given above, 67.60 parts by weight deionized water, and 6.68 parts by weight ethylene glycol monobutyl ether. The resultant mixture was stirred on cowles for about thirty minutes and milled in an attritor for one and a half hours.

Example 4

Red Pigment Paste 2 (Control)

A red pigment paste was prepared by mixing 8.0 parts by weight quinacridone pigment (C.I. Pigment Violet 19) and 55.0 parts by weight nonionic polyurethane grind resin. After stirring this mixture for thirty minutes, 30.0 parts by weight nonionic polyurethane grind resin and 7.0 parts by weight deionized water were added and the resultant mixture milled on the attritor for two hours.

The nonionic polyurethane resin was prepared according to the teachings of U.S. Pat. No. 4,794,147, the contents of which are incorporated herein by reference.

Example 5

Red Pigment Paste 3

A red pigment paste was prepared by adding 24.19 parts by weight diketopyrrolopyrrole pigment (C.I. Pigment Red 254) to a stirred mixture of 1.04 parts by weight grind resin, prepared in accordance with Example 2 given above, 68.04 parts by weight deionized water, and 6.73 parts by weight ethylene glycol monobutyl ether. The resultant mixture was stirred on cowles for about 30 minutes and milled on an attritor for one hour.

Example 6

Red Pigment Paste 3 (Control)

A red pigment paste was prepared by mixing 22.02 parts by weight diketopyrrolopyrrole pigment (C.I. Pigment Red 254) and 53.11 parts by weight nonionic polyurethane grind resin. After stirring this mixture for 30 minutes, 20.72 parts by weight nonionic polyurethane grind resin and 4.15 parts by weight deionized water were added and the resultant mixture milled on an attritor for two hours.

The nonionic polyurethane resin was prepared according to the teachings of U.S. Pat. No. 4,794,147, the contents of which are incorporated herein by reference.

Example 7

Fumed Silica Paste

A fumed silica paste was prepared by mixing together 12.16 parts by weight Aerosil®R-972 fumed silica (Degussa Corporation, 2 Penn Plaza New York, N.Y.), 31.36 parts by weight isopropanol, 17.10 parts by weight monobutyl ethylene glycol ether, and 5.90 parts by weight Resimene®, 747 methylated melamine formaldehyde resin, available from Monsanto Corp. 800 N. Lindbergh Blvd., St. Louis Mo. 63167. The resultant mixture was stirred on cowles for approximately thirty minutes after which 33.48 parts by weight nonionic polyurethane grind resin was added. The mixture was then run through a sand mill for two passes.

The nonionic polyurethane resin was prepared according to the teachings of U.S. Pat. No. 4,794,147, the contents of which are incorporated herein by reference.

Example 8

Red Iron Oxide Tint Paste

A red iron oxide pigment paste was prepared by mixing 35.86 parts by weight nonionic polyurethane resin, 10.11 parts by weight deionized water, and 37.99 parts by weight RO-3097 iron oxide pigment (Pfizer Inc., 235 E. 42nd St. New York, N.Y.). The resultant mixture was stirred on cowles for about thirty minutes and milled in an attritor for four hours.

The nonionic polyurethane resin was prepared according to the teachings of U.S. Pat. No. 4,794,147, the contents of which are incorporated herein by reference.

Example 9

Coating Composition 1

A coating composition was prepared that contained dispersant-stabilized diketopyrrolopyrrole and quinacridone pigments prepared in accordance with the present invention above.

| Coating Composition 1 | |
|---|---|
| Ingredient | Parts by weight |
| 1. 3% Pluricol P-1010[1] and 3% Laponite RD[2] dispersion in water | 16.56 |
| 2. Resimene ® 747 methylated melamine formaldehyde resin[3] | 8.36 |
| 3. Ethylene glycol monobutyl ether | 2.10 |
| 4. Nonionic polyurethane resin dispersion[4] | 36.20 |
| 5. Fumed Silica dispersion (Example 7) | 9.70 |
| 6. Red pigment paste 3 (Example 5) | 21.70 |
| 7. Red pigment paste 1 (Example 3) | 2.77 |
| 8. Iron oxide tint (Example 8) | 0.30 |
| 9. Nacure ® 2500 blocked acid catalyst[5] | 2.31 |
| | 100.00 |

[1]Surfactant from BASF Corporation, 1419 Biddle, Wyandotte, MI 48192.
[2]Synthetic bentonite clay from Laporte, Incorporated, Park 80 West, Plaza 11, Saddle Brook, NJ 07662.
[3]Melamine crosslinker from Monsanto Corporation, 800 North Lindbergh Boulevard, St. Louis, MO 63167.
[4]The nonionic polyurethane resin was prepared in accordance with the teachings of U.S. Pat. No. 4,794,147.
[5]Blocked acid catalyst from King Industries, P.O. Box 588, Science Road, Norwalk, CT 06852.

Components 2 and 3 were premixed, then added to component 1 with rapid stirring. To this mixture were then added, successively with rapid stirring, components 4–9. After mixing of all components, stirring was continued for about one hour, after which the coating was filtered into a container and capped for later use.

Example 10

Coating Composition 2 (Control)

A coating composition was prepared having the same pigment concentrations as in Example 9, but the diketopyrrolopyrrole and quinacridone pigment grind was prepared using the nonionic polyurethane grind resin according to Examples 6 and 4 respectively. The procedure for the preparation of this coating composition is as described in Example 9.

| Coating Composition 2 | |
|---|---|
| Ingredient | Parts by weight |
| 1. 3% Pluricol P-1010[1] and 3% Laponite RD[2] dispersion in water | 19.62 |
| 2. Resimene ® 747 methylated melamine formaldehyde resin[3] | 9.92 |
| 3. Ethylene glycol monobutyl ether | 2.48 |
| 4. Nonionic polyurethane resin dispersion[4] | 15.02 |
| 5. Fumed Silica dispersion (Example 7) | 11.50 |
| 6. Red pigment paste 4 (Example 6) | 28.95 |
| 7. Red pigment paste 2 (Example 4) | 9.46 |
| 8. Iron oxide tint (Example 8) | 0.35 |
| 9. Nacure ® 2500 blocked acid catalyst[5] | 2.70 |
| | 100.00 |

[1]Surfactant from BASF Corporation, 1419 Biddle, Wyandotte, MI 48192.
[2]Synthetic bentonite clay from Laporte, Incorporated, Park 80 West, Plaza 11, Saddle Brook, NJ 07662.
[3]Melamine crosslinker from Monsanto Corporation, 800 North Lindbergh Boulevard, St. Louis, MO 63167.
[4]The nonionic polyurethane resin was prepared in accordance with the teachings of U.S. Pat. No. 4,794,147.
[5]Blocked acid catalyst from King Industries, P.O. Box 588, Science Road, Norwalk, CT 06852.

We claim:

1. A dispersant for pigments comprising the reaction product of:
   (a) a functionalized copolymer, which is the reaction product of
      (i) an ethylenically unsaturated monomer having a reactive functionality which is selected from the group consisting of isocyanates, anhydrides and epoxy functionalities,
      (ii) at least one ethylenically unsaturated monomer having no reactive functionality to react with the reactive functionality of monomer (i),
   (b) at least one compound selected from the group consisting of polyalkylene glycol homopolymers, alkylene glycol copolymers and mixtures thereof; and
   (c) a compound having a pigment interactive substituent selected from the group consisting of
      i) hydrazides substituted with aliphatic, aromatic and substituted aromatic substituents, including alkyl, alkoxy, halogen and hydroxy substituted aromatic substituents and
      ii) imines having the formula

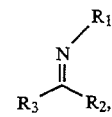

where $R_1$ is OH or NHR', and R' is H, alkyl or aryl, and $R_2$ and $R_3$ can be the same or different and are functionalities selected from the group consisting of aliphatic, aromatic, fused aromatic, benzoyl, substituted benzoyl, alkanoyl, substituted alkanoyl, substituted aromatic, wherein the substitution is alkyl, alkoxy, halogen, hydroxy, or mixtures thereof.

2. The dispersant of claim 1, further comprising
   (iii) an ethylenically-unsaturated aromatic monomer.

3. The dispersant of claim 2, wherein the ethylenically functional aromatic compound (iii) is selected from the group consisting of styrene, alpha-methyl styrene, tert-butyl styrene, para-hydroxy styrene, vinyl toluene, naphthyl acrylate, phenyl ethyl acrylate, phenyl methacrylate, naphthyl methacrylate, 3-phenylpropyl methacrylate, phenoxyethyl methacrylate, halogenated vinyl benzenes and mixtures thereof.

4. The dispersant of claim 2, wherein the ethylenically functional aromatic compound (iii) is present in an amount between 5 to 40 percent by weight, based on total monomer weight.

5. The dispersant of claim 1, further comprising
   (d) an end-capping compound, having an amine or hydroxy group selected from the group consisting of mono or dialkyl amines, mono or dicycloalkyl amines, heterocyclic amines, aromatic amines, araliphatic amines, mono and di alkanolamines and ether alcohols, for capping any unreacted isocyanate functionality remaining after the reaction of the functionalized copolymer with compounds (b) and (c).

6. The dispersant of claim 1, wherein the ethylenically unsaturated monomer having a reactive functionality (i) is selected from the group consisting of 1-(1-isocyanato-1-methylethyl)-3-(1-methylethenyl)benzene, isocyanato ethylacrylate, isocyanato ethyl methacrylate, itaconic anhydride, maleic anhydride, itaconic acid, and glycidyl methacrylate.

7. The dispersant of claim 1, wherein the ethylenically unsaturated monomer (ii) is selected from the group consisting of acrylic and methacrylic alkyl, aryl, aryl alkyl, alkoxyalkyl and aryloxyalkyl esters derived from alcohols having from 1 to 20 carbon atoms and mixtures thereof.

8. The dispersant of claim 1, wherein the ethylenically unsaturated monomer (ii) is selected from the group consisting of methyl, ethyl, propyl, n-butyl, isobutyl, tert-butyl, cyclohexyl, and 2-ethylhexyl acrylates and methacrylates.

9. The dispersant of claim 1, wherein the compound having a pigment interactive substituent is selected from the group consisting of hydrazides including benzoic hydrazide, oxamic hydrazide, 4-hydroxybenzoic hydrazide, 4-phenyl semicarbazide, napthoic hydrazide, substituted napthoic hydrazide, formic hydrazide, acetic hydrazide, benzenesulfonyl hydrazide and substituted benzenesulfonyl hydrazide and hydrazones including include benzil monohydrazone, fluorenone hydrazone, benzophenone hydrazone and salicylaldehyde hydrazone and oximes including benzil oxime, fluorenone oxime, benzophenone oxime and salicyladehyde oxime.

10. The dispersant of claim 1, wherein the compound having a pigment interactive substituent includes benzoic hydrazide and benzoic hydrazide substituted with alkyl, alkoxy, halogen or hydroxy substituents and mixtures thereof.

11. The dispersant of claim 1, wherein the copolymer is the reaction product of (i) ethylenically unsaturated monomer having a reactive functionality, where monomer (i) is present in an amount between 5 and 50 percent by weight and (ii) at least one ethylenically unsaturated monomer selected from the group consisting of acrylic and methacrylic alkyl, aryl, aryl alkyl, alkoxyalkyl and aryloxyalkyl esters present in an amount between 10 and 90 percent by weight where weights are based on total monomer weight.

12. The dispersant of claim 1, wherein the polyalkylene glycol monoalkyl compound is present in an amount between 20 and 60 percent by weight based on total non-volatile content of the dispersant.

13. The dispersant of claim 1, wherein the polyalkyleneglycol monoalkyl compounds are selected from the group consisting of polyalkylene glycol monoalkyl ethers and mixtures thereof.

14. The dispersant of claim 1, wherein the compound having a pigment interactive substituent is present in an amount between 1.0 and 20.0 percent by weight based on total nonvolatile content of the dispersant.

15. The dispersant of claim 1, wherein the weight average molecular weight of the copolymer is from 3,000 to 25,000.

16. The dispersant of claim 1, further comprising organic pigment.

17. The dispersant of claim 16, wherein the pigment is present in an amount between 3.0 percent and 25.0 percent by weight based on total weight of the aqueous coating composition.

18. The dispersant of claim 1, further comprising water.

* * * * *